(12) United States Patent
Schäfert

(10) Patent No.: US 6,617,811 B2
(45) Date of Patent: Sep. 9, 2003

(54) PROTECTIVE DEVICE FOR AN ELECTRIC STEERING SYSTEM

(75) Inventor: Arthur Schäfert, Sulzbach (DE)

(73) Assignee: Siemens VDO Automotive Corporation, Frankfurt (DE)

( * ) Notice: Subject to any disclaimer, the term of this patent is extended or adjusted under 35 U.S.C. 154(b) by 0 days.

(21) Appl. No.: 09/812,248

(22) Filed: Mar. 19, 2001

(65) Prior Publication Data

US 2001/0037909 A1 Nov. 8, 2001

(30) Foreign Application Priority Data

Mar. 17, 2000 (DE) .......................... 100 13 133

(51) Int. Cl.$^7$ .............. H02P 1/00; H02P 3/00; H02P 5/00; H02P 7/00
(52) U.S. Cl. .................. 318/139; 180/140; 74/362

(58) Field of Search ................. 180/140–143; 318/432, 433, 539, 139; 74/362

(56) References Cited

U.S. PATENT DOCUMENTS

| | | | | |
|---|---|---|---|---|
| 4,580,648 A | * | 4/1986 | Murakami et al. | 180/446 |
| 4,802,544 A | * | 2/1989 | Maeda | 180/446 |
| 5,444,622 A | * | 8/1995 | Takeshima et al. | 180/446 |
| 5,563,790 A | * | 10/1996 | Wada et al. | 180/446 |
| 6,131,692 A | * | 10/2000 | Kawasuji | 180/443 |

* cited by examiner

Primary Examiner—Jeffrey Donels
(74) Attorney, Agent, or Firm—Mayer, Brown, Rowe & Maw LLP.

(57) ABSTRACT

A protective device for an electric steering system of a motor vehicle having a control, an electric motor, a control circuit and a gear mechanism. The electric motor is connected to a brake circuit which applies an electrical load to the motor if the rotational speed exceeds a predefined value.

8 Claims, 2 Drawing Sheets

PROTECTIVE DEVICE FOR AN ELECTRIC STEERING SYSTEM

BACKGROUND OF THE INVENTION

1. Field of the Invention

The present invention relates generally to the field of automotive systems. More specifically, the present invention is directed to systems and methods for protecting an electric steering system of a motor vehicle having a control, an electric motor, a control circuit and a gear mechanism.

2. Description of the Related Art

In workshops, the steering systems of jacked-up motor vehicles is frequently adjusted by swiveling the front wheels of the vehicle. For example, this may be done to check the movement of the steering drive or to gain access, by means of an extreme position of the steering system, to parts which are to be checked or repaired. In such a situation, there is frequently a relatively fast and unbraked movement against the the mass inertia of the steering wheel and of the steering system result in high acceleration moments. This is particularly true when there is a high transition ratio between the wheel angle and the steering wheel angle. In addition, in the case of electrical power-assisted steering systems, the electric motor is also accelerated to a high degree, specifically to a particularly high rotational speed due to the relatively high gear transmission ratio. As a result when sudden braking occurs against the stop, very high acceleration moments can damage the gear mechanism between the electric motor and steering system.

In the vehicle manufacturer's schedule of specifications, a high maximum load capacity for the steering system is therefore provided, and this maximum load capacity far exceeds the steering moments (approximately 5 Nm) normally applied by the driver so that the vehicle passes the so-called workshop misuse test in which the front wheels are completely accelerated and pivoted unbraked against the steering lock. For this reason, the force transmission elements, in particular the gear mechanism of the steering system, must be dimensioned far beyond the normal requirements. Protection against the high acceleration moments could be provided, for example, with a slip clutch between the mass of the motor and the gear mechanism, but this a very technically complex solution.

SUMMARY OF THE INVENTION

The present invention is therefore based on the object of using simple and inexpensive means to reduce the high braking torque during rapid swiveling of the front wheels against the steering lock.

In an exemplary embodiment, an object of the present invention is achieved in that the electric motor is connected to a brake circuit which applies an electrical load to the motor if the rotational speed exceeds a predefined value.

The protective device according to the invention is suitable for so-called power-assisted steering systems in which the steering per se is effected by means of a steering wheel which is connected in a conventional mechanical way, and an electric motor is controlled in such a way that it supports the manually executed movement. In addition, the protective device according to an exemplary embodiment of the invention is advantageously also suitable for steering devices in which there is no direct mechanical connection provided between the control, for example the steering wheel, and the steering gear, but rather electrical control of the electric motor is provided in such a way that the steering complies with the inputs made via the control (i.e. steer-by-wire).

The protective device according to the invention ensures that the speed is limited as the front wheels swivel, and the deceleration when the steering lock is reached is also limited. In this arrangement, in the case of a swiveling movement which is not particularly fast, the force application required to execute it is not made greater. In the protective device according to the invention, the electric motor is operated as a generator and thus brakes the steering movement.

Accordingly, the steering characteristics during normal operation of the motor vehicle are not at all adversely affected by the protective device according to the invention. In one exemplary embodiment of the invention, the brake circuit is switched off by the control circuit while the motor vehicle is operating.

One advantageous refinement of the protective device according to the invention is obtained with extremely little expenditure in that the brake circuit is formed by a threshold circuit which is connected on the input side to the terminals serving the electric motor, and at least one semiconductor switch, which can be actuated by the threshold value circuit, of an output stage which is also used for driving. As an adaptation to customary output stages, there is preferably provision here for the load to be formed by at least two semiconductor switches of a bridge output stage.

A particularly simple brake circuit is achieved with this refinement in particular by virtue of the fact that the threshold value circuit is composed of two diodes which are each connected to a terminal of the electric motor and which are both connected to a pole of a Z diode, and wherein the other pole of the Z diode is connected to control inputs of the semiconductor switches.

In another advantageous exemplary embodiment, the protective device can be switched off by arranging switches which can be controlled by the control circuit in feeder lines of the threshold value circuit to the control electrodes, in which case, to increase safety, it is possible to provide for a further controllable switch to be arranged between at least one of the diodes and the Z diode. The controllable switches are preferably formed by a relay here.

The invention may be achieved in a variety of different physical structures. One exemplary embodiment is described below and illustrated schematically in the accompanying drawings, of which:

DETAILED DESCRIPTION OF THE PRESENTLY PREFERRED EMBODIMENTS

Figure 1:
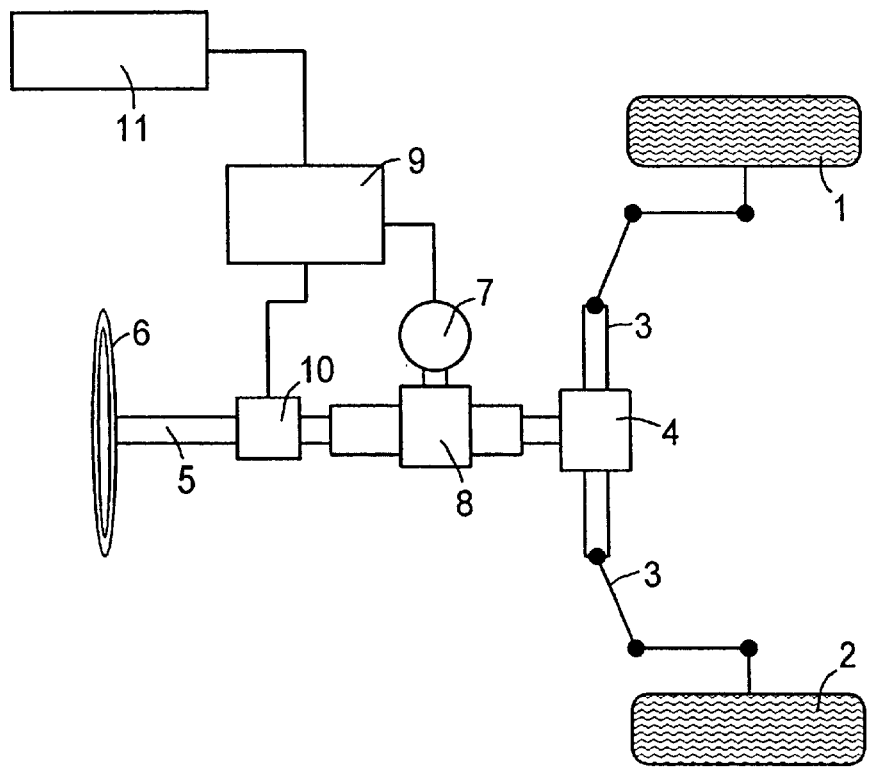
FIG. 1 illustrates a schematic view of a steering system of a motor vehicle with an electric power-steering system.

FIG. 1 is a schematic view of the steering Device of a motor vehicle with front wheels 1, 2, a steering mechanism 3, a steering gear mechanism 4, a steering shaft 5 and a steering wheel 6. The power assistance device provided is an electric motor 7 whose drive is connected via a wormgear 8 to the steering shaft 5 and which is controlled by a control circuit 9 and a torque sensor 10 in such a way that it complies as precisely as possible with the parameters set using the steering wheel 6.

In addition, the control circuit 9 receives, from the vehicle's electrical system 11, signals which describe the operating state of the motor vehicle in so far as it is relevant to the power-assisted steering.

In conventional vehicle steering systems, the transmission ratio between the wheel angle (steered angle) and the steering wheel angle is approximately 1:17, and that between the wheel angle and the motor angle is approximately 1:300. As a result, the electric motor 7 is accelerated to a relatively high rotational speed if the front wheels 1, 2 are moved against the stop as fast as is possible by hand.

The electric motor 7 is now braked by the protective device according to the invention if it exceeds a predefined rotational speed with the result that the front wheels 1, 2 cannot be swiveled against the stop at such a high speed.

Figure 2:
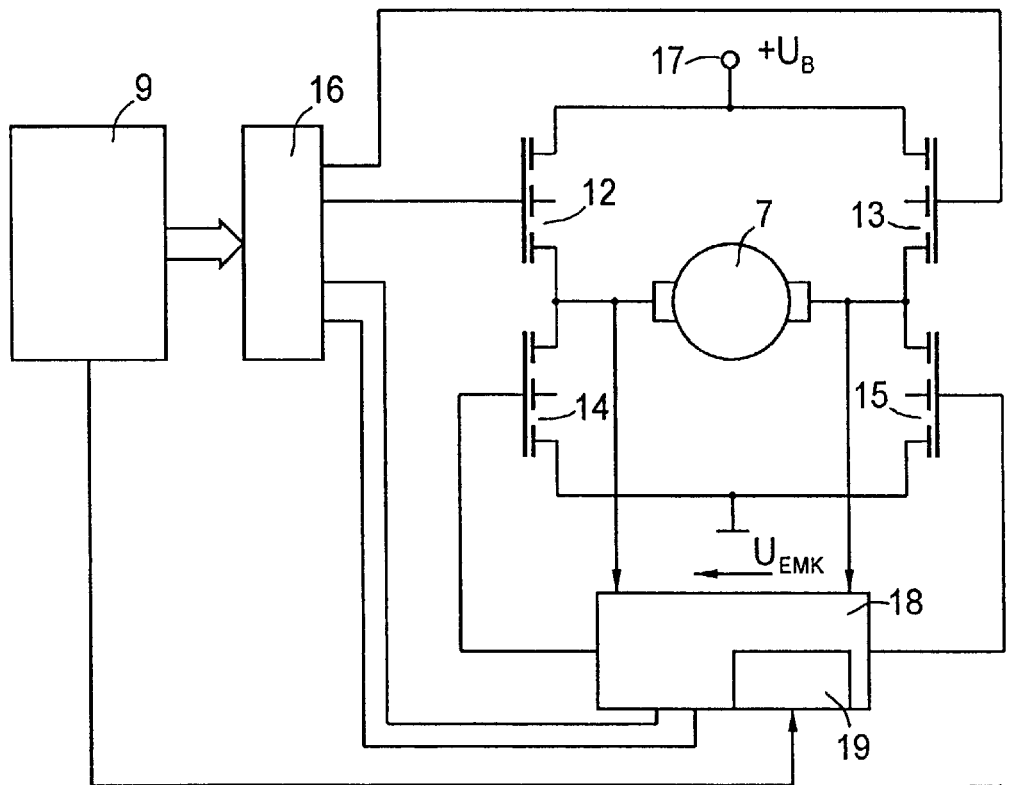
FIG. 2 illustrates an exemplary embodiment of a protective device according to the present invention and parts of a known circuit for a power-steering system.

In the exemplary embodiment illustrated in FIG. 2, a bridge output stage comprised of field effect transistors 12, 13, 14, 15, which is actuated in a manner known per se by a driver circuit 16, is provided for operating the electric motor 7. At 17, the bridge output stage is supplied with the battery voltage $U_B$, while the other terminal of the bridge output stage is connected to ground. If the electric motor 7 is mechanically driven by swiveling the wheels, it operates as a generator so that a voltage $U_{EMK}$ is generated at its terminals. The voltage $U_{EMK}$ is fed to the inputs of a brake circuit 18 which is connected at the output end into the control lines between the driver circuit 16 and the controlled electrodes of the field effect transistors 14 and 15.

As soon as $U_{EMK}$ exceeds a predefined value, which corresponds to a predefined rotational speed being exceeded, the field effect transistors 14 and 15 are switched on, and thus load the electric motor 7, which is then virtually incapable of rotating faster. A part 19 of the brake circuit 18 is used to switch off the brake circuit 18 when the vehicle is operating, and said part 19 is controlled by the control circuit 9.

Figure 3:
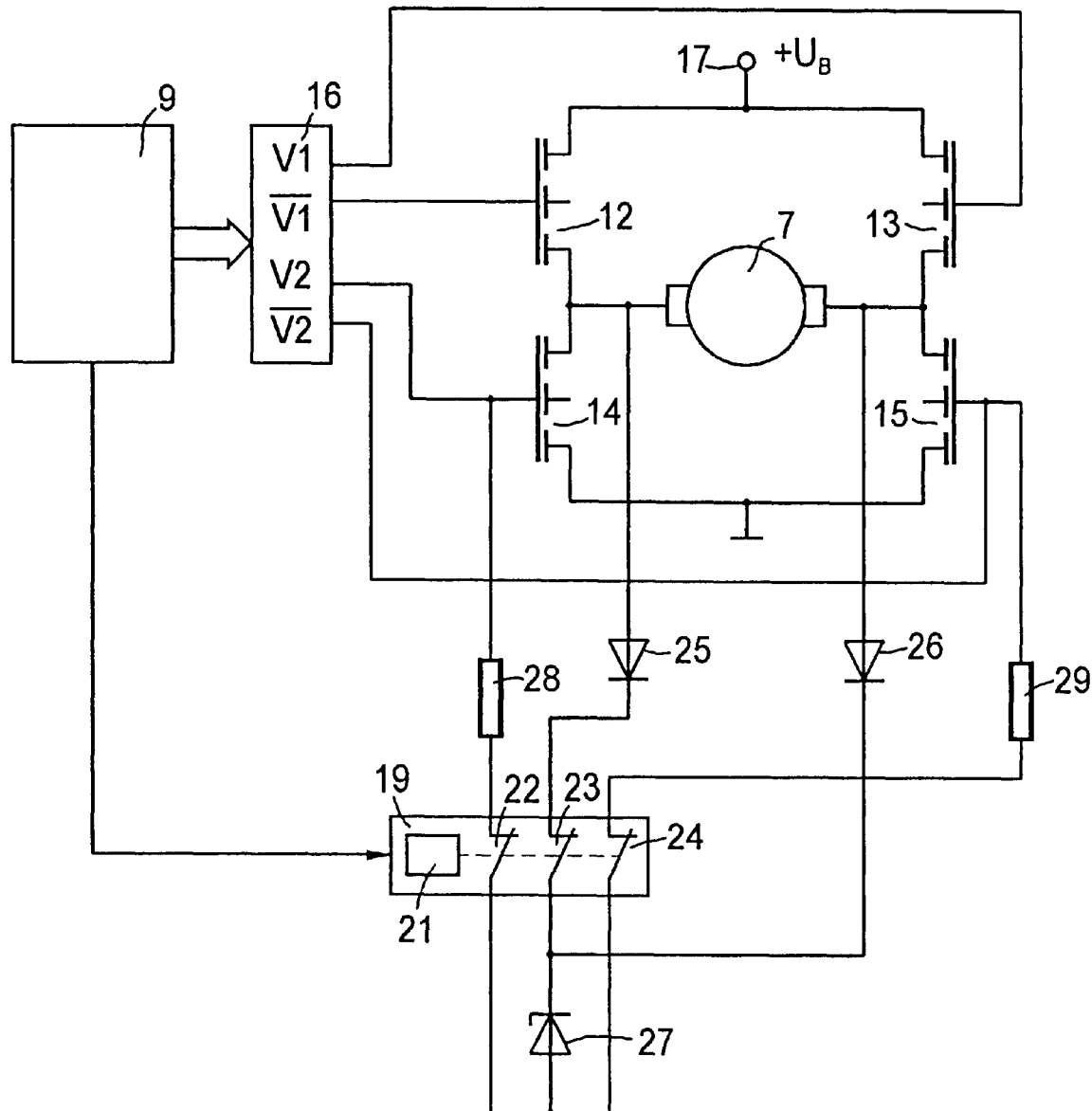
FIG. 3 illustrates the details of an exemplary embodiment of the present invention.

FIG. 3 shows, in the same way as FIG. 2, the control circuit 9, the driver circuit 16, the electric motor 7 and the bridge output stage 12 to 15. However, the brake circuit is illustrated in more detail. Here, the deactivation device is formed by a relay 19 with a core 21 and three contact pairs 22, 23, 24. The relay 19 is illustrated in a state in which the power-assisted steering system is switched off and the protective device according to the invention is activated.

In each case, a terminal of the electric motor 7 is connected to a pole of a Z diode 27 via a diode 25, 26, which, in the case of the diode 25, takes place via the contact pair 23. The other pole of the Z diode 27 is connected to the control electrodes of the field effect transistors 14, 15 in each case via a further contact pair 22, 24 of the relay 21 and via, in each case, a resistor 28, 29. Here, the resistors 28 and 29 are used to limit the gate current of the field effect transistors 14, 15.

Depending on the direction of rotation of the electric motor 7, one of the diodes 25, 26 is switched on and the Z diode 27 is supplied with positive voltage. This, however, only causes the field effect transistors 14, 15 to be switched on above the breakdown voltage of the Z diode 27. The braking operation already described is then initiated.

We claim:

1. A protective device for a steering system of a motor vehicle having a steering wheel mechanically coupled to wheels of the vehicle allowing a driver to rotate the steering wheel to cause the vehicle wheels to turn; the protective device comprising:
    an electric motor coupled to the steering system to assist the turning of the vehicle wheels in response to the steering wheel;
    a control circuit; and
    wherein the electric motor is connected to a brake circuit which applies an electrical load to the motor if a rotational speed of the electric motor exceeds a predefined value.

2. The protective device for a steering system as claimed in claim 1, wherein the brake circuit is switched off by the control circuit while the motor vehicle is operating.

3. The protective device for a steering system as claimed in claim 1, wherein the brake circuit is formed by a threshold circuit which has an input side connected to the terminals of the electric motor, and at least one semiconductor switch, which can be actuated by the threshold value circuit.

4. The protective device as claimed in claim 3, wherein the load is formed by at least two semiconductor switches of a bridge output stage.

5. The protective device as claimed in claim 4, wherein the threshold circuit is comprised of two diodes which are each connected to a terminal of the electric motor and which are both connected to a first pole of a Z diode, and wherein a second pole of the Z diode is connected to control inputs of the semiconductor switches.

6. The protective device as claimed in claim 1, wherein switches which can be controlled by the control circuit are arranged in feeder lines of the threshold circuit to the control electrodes.

7. The protective device as claimed in claim 6, wherein a further controllable switch is arranged between at least one diode and the Z diode.

8. The protective device as claimed in claim 6, wherein the controllable switches are comprised of a relay.

* * * * *